United States Patent
Ito et al.

(10) Patent No.: US 7,924,128 B2
(45) Date of Patent: Apr. 12, 2011

(54) MAGNET UNIT, ELEVATOR GUIDING APPARATUS AND WEIGHING APPARATUS

(75) Inventors: Hiroaki Ito, Tokyo (JP); Mimpei Morishita, Tokyo (JP); Yosuke Tonami, Tokyo (JP)

(73) Assignee: Toshiba Elevator Kabushiki Kaisha, Tokyo (JP)

( * ) Notice: Subject to any disclaimer, the term of this patent is extended or adjusted under 35 U.S.C. 154(b) by 937 days.

(21) Appl. No.: 11/579,343

(22) PCT Filed: May 10, 2005

(86) PCT No.: PCT/JP2005/008845
§ 371 (c)(1),
(2), (4) Date: Nov. 2, 2006

(87) PCT Pub. No.: WO2005/108273
PCT Pub. Date: Nov. 17, 2005

(65) Prior Publication Data
US 2008/0257655 A1    Oct. 23, 2008

(30) Foreign Application Priority Data
May 11, 2004   (JP) ................................ 2004-140763

(51) Int. Cl.
*H01F 7/08* (2006.01)
*H01F 7/00* (2006.01)
*H02K 41/02* (2006.01)

(52) U.S. Cl. .................. 335/229; 310/12.11; 310/12.21; 310/12.22; 310/12.24

(58) Field of Classification Search ............... 310/12.09, 310/12.11, 12.21, 12.22, 12.24–12.26, 181; 187/292
See application file for complete search history.

(56) References Cited

U.S. PATENT DOCUMENTS
4,370,577 A * 1/1983 Wakabayashi et al. .... 310/12.24
(Continued)

FOREIGN PATENT DOCUMENTS
EP    1 067 083 A2    1/2001
(Continued)

*Primary Examiner* — Elvin G Enad
*Assistant Examiner* — Alexander Talpalatskiy
(74) *Attorney, Agent, or Firm* — Foley & Lardner LLP

(57) ABSTRACT

A magnet unit includes a first magnetic pole (7a), a second magnetic pole (7b) and a third magnetic pole (7c) at a center between the first magnetic pole (7a) and the second magnetic pole (7b), providing an E-shaped configuration. In the magnet unit, a first magnet is defined between the first magnetic pole (7a) and the third magnetic pole (7c) by connecting two electromagnets (71aa, 73aa) with each other through a permanent magnet (72a), while a second magnet is defined between the second magnetic pole (7b) and the third magnetic pole (7c) by connecting two electromagnets (71ba, 73ba) with each other through a permanent magnet (72b). With this configuration, it is possible to reduce a deviation in the length of respective magnetic paths from the permanent magnets (72a, 72b) up to their respective magnetic poles. By controlling exciting currents to the respective magnetic poles. By controlling exciting currents to the respective electromagnets (71aa, 73aa, 71ba, 73ba), it is also possible to adjust fluxes (or flux density) in respective directions x, y individually.

3 Claims, 9 Drawing Sheets

U.S. PATENT DOCUMENTS

| | | |
|---|---|---|
| 4,429,757 A | 2/1984 | Kunz |
| 4,504,750 A * | 3/1985 | Onodera et al. ........... 310/12.21 |
| 4,545,448 A | 10/1985 | Kunz |
| 4,722,409 A | 2/1988 | Kunz |
| 4,754,849 A | 7/1988 | Ando |
| 5,010,262 A * | 4/1991 | Nakagawa et al. ........ 310/12.21 |
| 5,218,250 A * | 6/1993 | Nakagawa ................. 310/12.21 |
| 5,439,075 A | 8/1995 | Skalski et al. |
| 5,495,131 A * | 2/1996 | Goldie et al. .............. 310/12.15 |
| 5,854,521 A * | 12/1998 | Nolle ..................... 310/216.004 |
| 6,268,673 B1 * | 7/2001 | Shah et al. ................... 310/90.5 |
| 6,401,872 B1 * | 6/2002 | Morishita ..................... 187/292 |
| 6,408,987 B2 * | 6/2002 | Morishita ..................... 187/292 |
| 6,510,925 B1 | 1/2003 | De Jong |

FOREIGN PATENT DOCUMENTS

| | | |
|---|---|---|
| GB | 440 244 | 12/1935 |
| GB | 2 262 932 | 7/1993 |
| JP | 05056626 A * | 3/1993 |
| JP | 08308207 A * | 11/1996 |
| JP | 09289765 A * | 11/1997 |
| JP | 10-236748 A | 9/1998 |
| JP | 2001-019286 A | 1/2001 |
| JP | 2003047231 A * | 2/2003 |
| TW | 546249 | 8/2003 |

* cited by examiner

MAGNET UNIT, ELEVATOR GUIDING APPARATUS AND WEIGHING APPARATUS

TECHNICAL FIELD

The present invention relates to the improvement of a magnet unit that is preferred to an elevator guiding apparatus and the like.

BACKGROUND ART

In an elevator, generally, guide rails are arranged in pairs on an elevator shaft vertically. Being guided by these guide rails, an elevator car suspended by a main rope moves up and down the elevator shaft.

In order to allow the elevator car to be guided along the guide rails, a guide device is mounted on a car frame of the elevator car.

There are a roller-type guide device and a guide shoe-type guide device. Since these guide devices guide the elevator car with being in contact with the guide rails directly, these guide devices are predisposed to generate vibrations and noises due to distortion and connections of the guide rails, so such vibrations and noises are easily propagated into the elevator car though rollers and the like.

Thus, an elevator guiding apparatus that adopts a magnet unit for the guide rails is proposed (e.g. Japanese Patent Application Laid-open No. 2001-19286). In the elevator guiding apparatus, an attracting force of a magnet is generated between the opposing guide rails made of iron, guiding the elevator car in a non-contact manner, based on detection signals of a gap sensor.

FIG. 1 is a perspective view of the substantial part of the above-mentioned conventional elevator guiding apparatus. FIG. 2 is a plan view of a magnetic circuit of the magnet unit of FIG. 1.

As shown in FIGS. 1 and 2, the magnet unit 1 having an E-shaped configuration includes a center core 11, permanent magnets 12a, 12b connected to both sides of the center core 11 to have respective identical poles opposing to each other and electromagnets 13a, 13b connected to the permanent magnets 12a, 12b respectively to have respective identical poles opposing each other.

In FIG. 1, the magnet unit 1 is provided with a plurality of sensors 2 having gap sensors. The sensors 2 are adapted so as to detect the condition of a magnetic circuit (magnetic path) at gaps between the poles of the magnet unit 1 and a guide rail 3 in both of x, y directions (horizontal direction), in other words, detecting a physical quantity in the magnetic circuit.

As the elevator guiding apparatus controls attraction forces between the electromagnets 13a, 13b and the guide rail 3 in accordance with the exciting current control of the electromagnets 13a, 13b based on detection signals of the sensors 2, a not-shown elevator car equipped with the elevator guiding apparatus can move up and down in the elevator shaft while maintaining a non-contact condition between the apparatus and the guide rail 3.

In the elevator guiding apparatus using the above-constructed magnet unit, when the elevator car is in a normal position to the guide rail 3 and its operation is stable, it is possible to make exciting currents for coils 13aa, 13ba converge to zero, that is, so-called "zero power control" owing to the possession of the permanent magnets 12a, 12b. Accordingly, it is possible to suppress electric power consumption in the stationary state. Additionally, owing to the provision of the permanent magnets, an interval between the guide rail 3 and the magnet unit 1 could be broadened furthermore to allow the elevator car to elevate smoothly along the guide rail 3 with a long stroke and a low rigidity.

Note that, in the elevator guiding apparatus for guiding the movement of the elevator car along the guide rails 3, there are sensors 2 and magnet units 1 arranged at four (up, down, left and right) positions about the elevator car, facing the guide rails 3. In operation, with a calculation based on signals from the sensors 2 to detect the conditions of magnetic circuits at respective gaps between the guide rail 3 and the magnet unit 1 and signals from the magnet units 1 to detect exciting currents, a feedback control is applied on the exciting currents.

Regarding FIGS. 1 and 2, it is defined here that "x" represents a direction along which the magnet unit 1 opposes the guide rail 3 (generally, left-and-right direction of the elevator car viewed from its entrance side); "y" represents a direction perpendicular to the direction x in a horizontal plane (i.e. a depth direction of the elevator car); and "z" represents a vertical direction. In connection, "ξ", "θ" and "φ" represents rotating directions around the directions x, y and z as axes of rotation.

Since the above-mentioned elevator guiding apparatus is constructed so as to control the magnet units 1 at four positions with a calculation based on respective signals from the upper and lower sensors 2 in the directions x and the upper and lower sensors 2 in the direction y to detect length of gaps and also based on respective values of exciting currents on detection, the elevator car is capable of moving up and down while being guided by the guide rails 3 under posture controls about "rolling direction" (i.e. the direction θ), "pitching direction" (i.e. the direction ξ) and "yawing direction" (i.e. the direction φ) as well as the translating movement in the directions x and y.

The magnet unit 1 shown in FIG. 2, however, has a problem described as follows.

For the description, firstly, left and right long surfaces in the section of the guide rail 3 are defined as a first guide face 3a and a second guide face 3b respectively, while a short surface of the section is defined as a third guide face 3c. Correspondingly, respective magnetic poles of the magnet unit 1 respectively opposing the guide faces 3a, 3b and 3c are defined as a first magnetic pole 1a, a second magnetic pole 1b and a third magnetic pole 1c, respectively. In FIG. 2, two-dotted lines with arrows denote magnetic flux lines by permanent magnets 12a, 12b. Consequently, it will be understood that magnetic flux (or flux density) at the third magnetic pole 1c becomes larger than magnetic flux (or flux density) at the first magnetic pole 1a or the second magnetic pole 1b since magnetic flux lines of the permanent magnets 12a, 12b are superimposed on each other at the third magnetic pole 1c.

Additionally, it is noted that the shorter a magnetic path from a permanent magnet up to a magnetic pole gets, the smaller a leakage of flux from the permanent magnet becomes. Therefore, the flux density at the third magnetic pole 1c becomes larger than the flux density at the first magnetic pole 1a or the same at the second magnetic pole 1b because of a difference in respective magnetic paths between the permanent magnets 12a, 12b and the magnetic poles 1a, 1b, 1c.

Consequently, an attraction force generated between the third guide face 3c and the third magnetic pole 1c is remarkably large in comparison with an attraction force between the first guide face 3a and the first magnetic pole 1a or between the second guide face 3b and the second magnetic pole 1b.

The conventional magnet unit 1 mentioned above is generally used for an elevator guiding apparatus or a weighing apparatus for measuring a weight of an object in a non-contact manner. In the case of adopting the magnet unit 1 in the elevator guiding apparatus, however, the stability of an elevator car in its equilibrium situation is damaged due to the above difference of attraction force in between the backward-and-forward direction (i.e. the direction y) and the left-and-right direction (i.e. the direction x). Additionally, the magnets unit's reaction forces reactive to disturbance applied to the elevator car are different from each other depending on displacement directions of the elevator car.

The electromagnets 13a, 13b of the conventional magnet unit 1 have a great influence on the first magnetic pole 1a and the second magnetic pole 1b, respectively. While, the electromagnets 13a, 13b have little influence on the third magnetic pole 1c because of interposition of the permanent magnets 12a, 12b.

In this way, the conventional magnet unit 1 has great differences in both attraction force and controllability between the directions (i.e. the direction x and the direction y) since the controllability of the electromagnets 13a, 13b against the third magnetic pole 1c is small while an attraction force of the permanent magnets 12a, 12b at the pole 1c is large. Accordingly, an elevator guiding apparatus adopting the above magnet unit(s) or the like has a reduced stability in operation since both responsibility and controllability of the magnets are different from each other depending on the directions.

In order to contemplate equalization in controllability with compensation for the reduced controllability of the electromagnets 13a, 13b to the third magnetic pole 1c, it might be supposed to supply the electromagnets 13a, 13b with great exciting currents in a moment of time. However, this measure is accompanied with great electric power consumption, requiring a capacious power source.

DISCLOSURE OF INVENTION

In the above-mentioned situation, it is an objective of the present invention to provide a magnet unit that can accomplish a reduction of deviations of attraction forces of permanent magnets due to the directions of the magnetic forces and can enhance their controllability to respective magnetic poles, thereby allowing a reduction in the capacity of a power source. Another objective of the invention is to provide an elevator guiding apparatus and the like having such a magnet unit and operates stably with high efficiency.

In order to achieve the above objectives, according to the first aspect of the present invention, there is provided a magnet unit having an E-shaped configuration, comprising: first and second magnetic poles opposed to each other, having same polarity; a third magnetic pole arranged at a center between the first magnetic pole and the second magnetic pole, having different polarity from that of the first and second magnetic poles; a first magnet defined between the first magnetic pole and the third magnetic pole, the first magnet having two electromagnets connected with each other through the intermediary of a permanent magnet; and a second magnet defined between the second magnetic pole and the third magnetic pole, the second magnet having two electromagnets connected with each other through the intermediary of another permanent magnet.

With the above configuration of both the first magnet and the second magnet, a deviation in magnetic paths from each permanent magnet up to respective magnetic poles of the magnet unit is reduced, and fluxes (or flux densities) at respective magnetic poles can be controlled individually.

That is, since the directional deviation in the attraction forces of the permanent magnets is reduced with an improvement in the controllability of the exciting currents to respective magnetic poles, it is possible to provide a magnet unit which is well-balanced in operation and further stable in both responsibility and controllability in operation.

Additionally, according to the present invention, there is also provided an elevator guiding apparatus comprising: a magnet unit having an E-shaped configuration, including first and second magnetic poles opposed to each other, having same polarity, a third magnetic pole arranged at a center between the first magnetic pole and the second magnetic pole, having different polarity from that of the first and second magnetic poles, a first magnet defined between the first magnetic pole and the third magnetic pole, the first magnet having two electromagnets connected with each other through the intermediary of a permanent magnet, and a second magnet defined between the second magnetic pole and the third magnetic pole, the second magnet having two electromagnets connected with each other through the intermediary of another permanent magnet, wherein that the first, second and third magnetic poles are arranged so as to oppose a guide member made of magnetic material through respective gaps; a plurality of sensors for detecting respective conditions of magnetic circuits in the magnet unit; and a control unit for controlling exciting currents supplied to the electromagnets of the magnet unit based on output signals from the sensors.

In the above elevator guiding apparatus, as the control unit controls the exciting currents of the magnet unit based on output signals from the sensors, there are obtained, between the guide rail and the magnet unit, appropriate attraction forces and controllability both having small deviations in directions, allowing the elevator car to travel in an elevator shaft stably.

Further, according to the present invention, there is also provided a weighing apparatus comprising: a movable body for mounting an object to be measured, the movable body having a plurality of magnet units attached to sidewalls of the movable body on exterior sides, the magnet unit having an E-shaped configuration, the magnet unit including first and second magnetic poles opposed to each other, having same polarity, a third magnetic pole arranged at a center between the first magnetic pole and the second magnetic pole, having different polarity from that of the first and second magnetic poles, a first magnet defined between the first magnetic pole and the third magnetic pole, the first magnet having two electromagnets connected with each other through the intermediary of a permanent magnet, and a second magnet defined between the second magnetic pole and the third magnetic pole, the second magnet having two electromagnets connected with each other through the intermediary of another permanent magnet; a frame for supporting the movable body movable in a vertical direction and provided with a plurality of guide members made of magnetic material corresponding to the magnet units, respectively; a plurality of sensors for detecting respective conditions of magnetic circuits in the magnet units at respective gaps each between the magnetic poles of the magnet units and the guide member; and a control unit for controlling exciting currents to electromagnets of the magnet units based on output signals from the sensors.

Still further, according to the present invention, there is also provided another weighing apparatus comprising: a movable body for mounting an object to be measured, the movable body having a plurality of guide member made of magnetic material attached to sidewalls of the movable body on exterior sides; a frame for supporting the movable body movable in a vertical direction and provided with a plurality of magnet units facing the guide members, the magnet unit having an E-shaped configuration, the magnet unit including first and second magnetic poles opposed to each other, having same polarity, a third magnetic pole arranged at a center between the first magnetic pole and the second magnetic pole, having different polarity from that of the first and second magnetic poles, a first magnet defined between the first magnetic pole and the third magnetic pole, the first magnet having two electromagnets connected with each other through the intermediary of a permanent magnet, and a second magnet defined between the second magnetic pole and the third magnetic pole, the second magnet having two electromagnets connected with each other through the intermediary of another permanent magnet; a plurality of sensors for detecting respective conditions of magnetic circuits in the magnet units at respective gaps each between the magnetic poles of the magnet unit and the guide member; and a control unit for controlling exciting currents to electromagnets of the magnet units based on output signals from the sensors.

In each of above weighing apparatuses, as the control unit controls the exciting currents of the magnet unit based on output signals from the sensors, there can be attained, between the guide member and the magnet unit, appropriate attraction forces and controllability both having small deviations in directions, allowing the weight of the object to be measured stably and effectively.

These and other objectives and features of the present invention will become more fully apparent from the following description and appended claims taken in conjunction with the accompanied drawings.

BEST MODE FOR CARRYING OUT THE INVENTION

Figure 1:
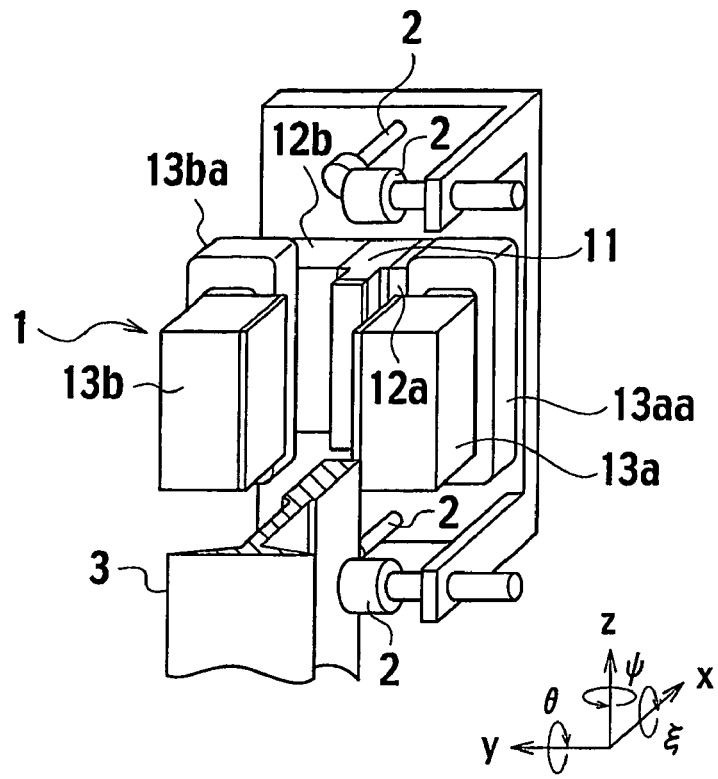
FIG. 1 is a perspective view of a conventional magnet unit.
Figure 2:
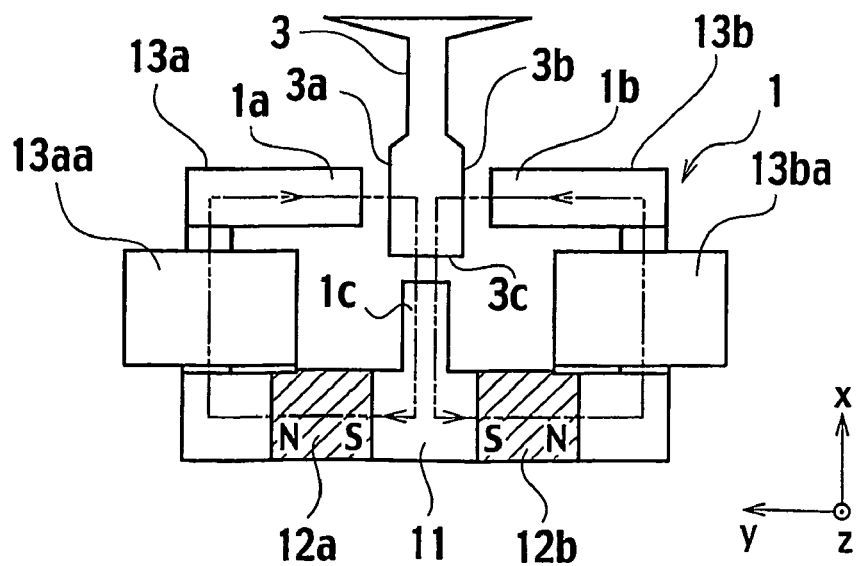
FIG. 2 is a plan view showing a magnetic circuit of the magnet unit of FIG. 1.

Now referring to FIGS. 3 to 10, an embodiment of a magnet unit of the present invention, an embodiment of an elevator apparatus having the magnet unit of the invention and an embodiment of a weighing apparatus also having the magnet unit will be described below. Note that, in these embodiments, like elements to those of the prior art magnet unit and the prior art elevator guiding apparatus of FIGS. 1 and 2 are indicated with like reference numerals, respectively. Their overlapping descriptions are eliminated.

Figure 3:
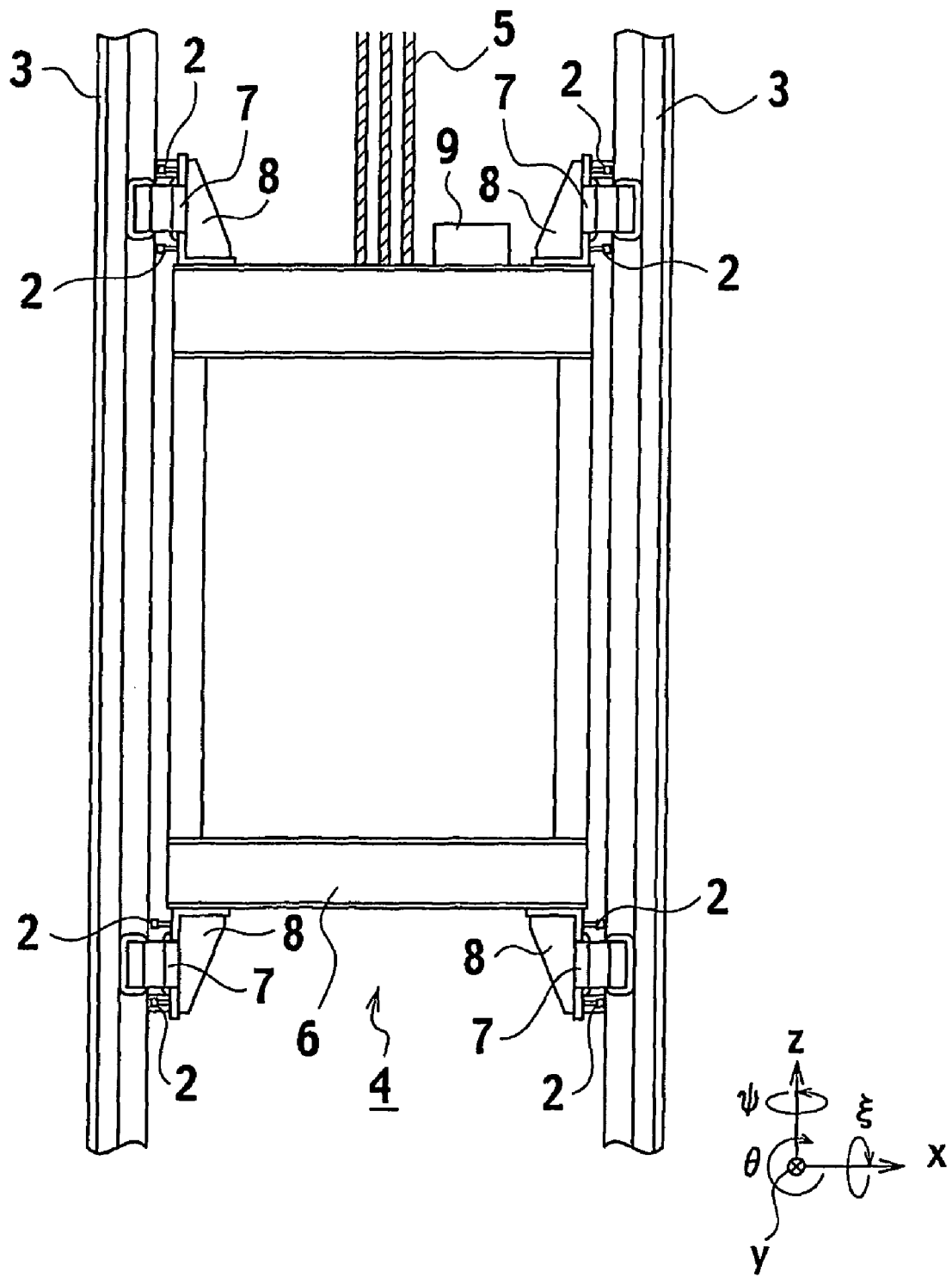
FIG. 3 is a structural view of an elevator having an elevator car in its elevating movement and equipped with an elevator guiding apparatus having a magnet unit in accordance with the first embodiment of the present invention.

FIG. 3 is a side view of an elevator equipped with the elevator guiding apparatus. The elevator guiding apparatus shown in this figure adopts the magnet unit in accordance with one embodiment of the present invention.

As shown in FIG. 3, a pair of guide rails 3, 3 made from iron ferromagnetic bodies are laid vertically in an elevator shaft 4. An elevator car 6 suspended by ropes 5 moves up and down while being guided by the guide rails 3, 3.

At four corners of a car frame of the elevator car 6, E-shaped magnet units 7 respectively opposing the guide rails 3, 3 and serve as a guide device, and sensors 2 for detecting respective conditions of magnetic circuits (magnetic paths) in gaps between respective poles of the magnet units 7 and the guide rails 3, 3, are attached to the elevator car 6 through pedestals 8. The pedestals 8 made of non-magnetic material, such as aluminum, stainless steel and plastics, are fixed to the car frame of the elevator car 6.

Note that left and right direction in the figure, that is, the horizontal direction to the elevator car 6 is defined as "x direction"; the direction of the normal line to the figure is defined as "y direction"; and the vertical direction is defined as "z direction" in FIG. 1. Similarly, respective rotating directions around the respective x, y, z directions as axes of rotation are defined as "$\xi$, $\theta$, $\phi$ directions", respectively.

Each of the sensors 2 is formed by a so-called "gap sensor" for detecting an interval (distance) between each pole of the E-shaped magnet unit 7 and the guide rail 3.

Figure 4:
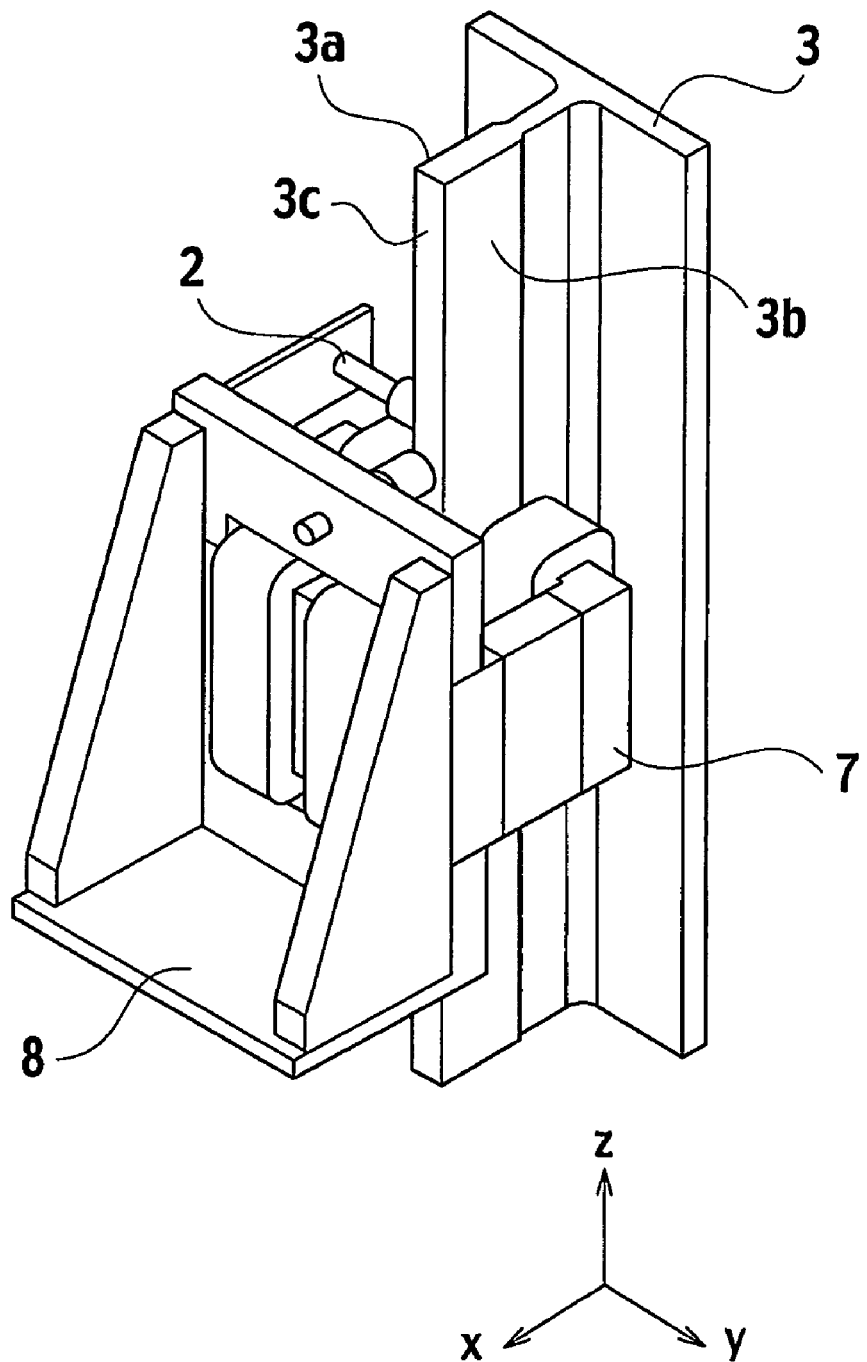
FIG. 4 is an enlarged perspective view of a substantial part of the elevator guiding apparatus of FIG. 3.
Figure 5:
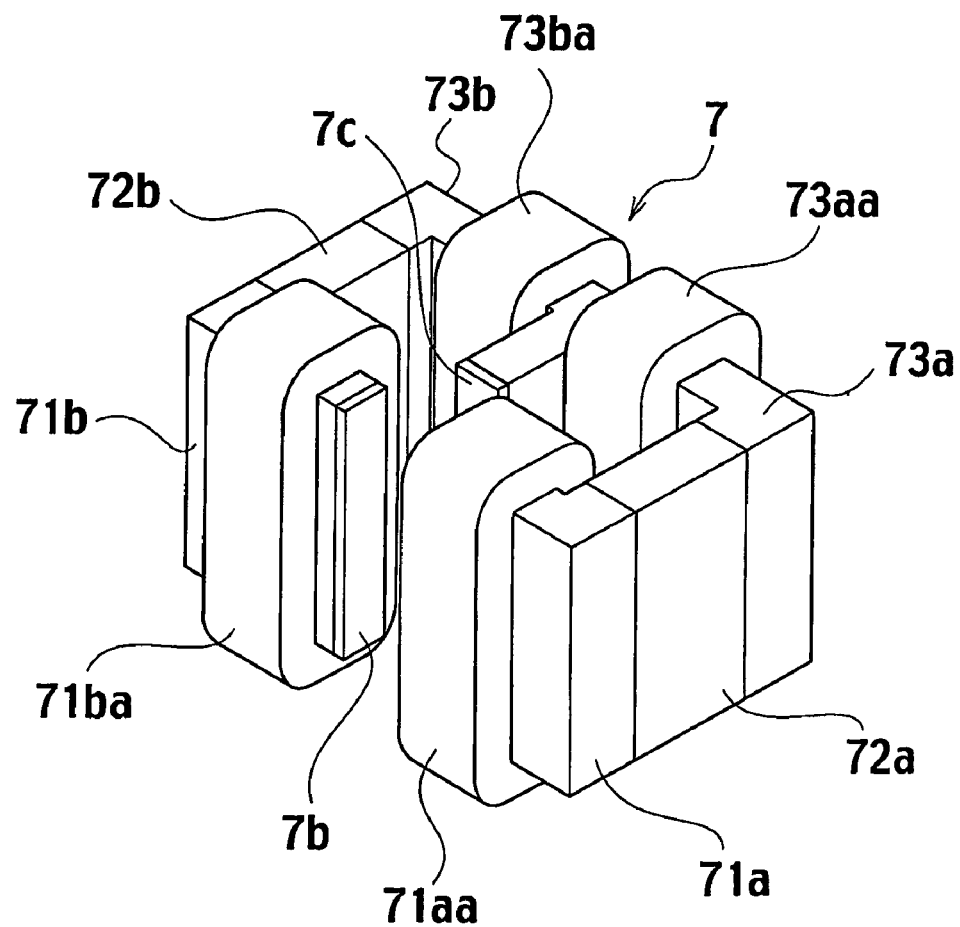
FIG. 5 is a perspective view of the magnet unit of FIG. 4, viewed from the opposite side.

FIG. 4 is an enlarged perspective view of the substantial part of FIG. 3 and FIG. 5 is a perspective view of the magnet unit 7 of FIG. 4, viewed from the opposite side.

Figure 6:
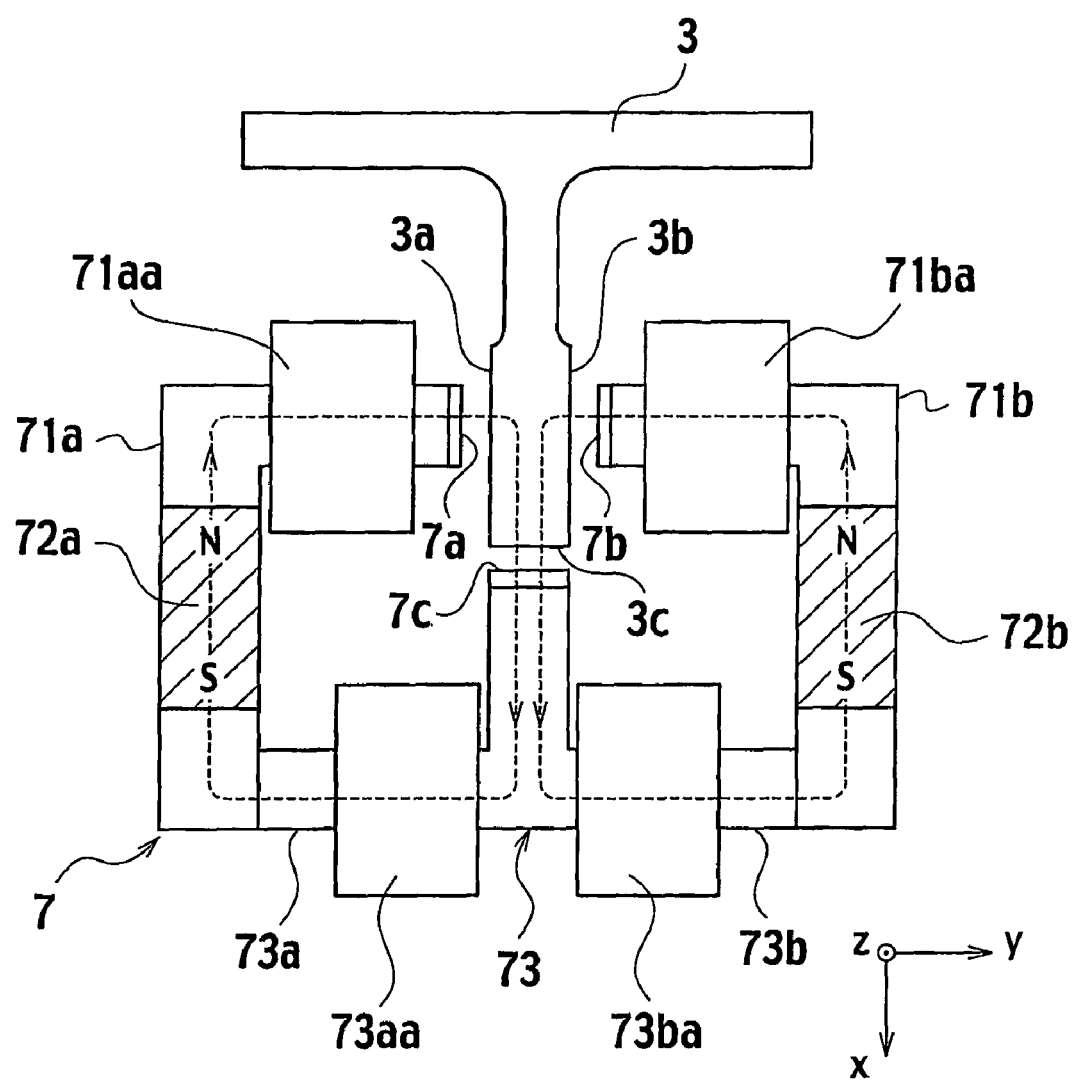
FIG. 6 is a plan view showing a magnetic circuit of the magnet unit of FIG. 4.

FIG. 6 is a plan view of a magnetic circuit of the magnet unit 7 of FIG. 5, including the guide rail 3 opposing the unit 7.

With regard to respective surfaces of the guide rail 3 opposing the E-shaped magnet unit 7, two opposing surfaces of the guide rail 3 perpendicular to the direction y are defined as a first guide face 3$a$ and a second guide face 3$b$, respectively, as shown in FIGS. 4 and 6. One surface of the guide rail 3 perpendicular to the direction x is defined as a third guide face 3$c$.

While, as shown in FIGS. 5 and 6, the E-shaped magnet unit 7 includes a first electromagnet 71$a$ and a second electromagnet 71$b$ arranged so as to oppose the first guide face 3$a$ and the second guide face 3$b$ of the guide rail 3, respectively, and a center electromagnet 73 composed of third and fourth electromagnets 73$a$, 73$b$ arranged so as to oppose the third guide face 3$c$. Respective coils 71$aa$, 71$ba$, 73$aa$, 73$ba$ are wound about the electromagnets 71$a$, 71$b$, 73$a$, 73$b$ and further supplied with exciting currents, respectively.

The first and second electromagnets 71$a$, 71$b$ are connected to the third and fourth electromagnets 73$a$, 73$b$ through a first permanent magnet 72$a$ and a second permanent magnet 72$b$, respectively. The first and second permanent magnets 72$a$, 72$b$ are arranged so that their respective identical poles oppose each other.

A first magnetic pole 7$a$, a second magnetic pole 7$b$ and a third magnetic pole 7$c$ are formed at both ends of the first and second electromagnets 71$a$, 71$b$ and one end of the center electromagnet 71$c$ opposing the first, second and third guide faces 3$a$, 3$b$ and 3$c$, respectively. The first permanent magnet 72$a$ connects the first electromagnet 71$a$ with the third electromagnet 73$a$ to form one magnet. The second permanent magnet 72$b$ connects the second electromagnet 71$b$ with the fourth electromagnet 73$b$ to form another magnet.

That is, since the permanent magnets 72$a$, 72$b$ have respective both ends connected to the electromagnets 71$a$, 73$a$ and 71$b$, 73$b$, a deviation in magnetic paths from the magnets 72$a$, 72$b$ up to the respective magnetic poles (7$a$, 7$c$; 7$b$, 7$c$) becomes smaller, so that there is no great difference in leakage flux in the course of reaching the respective poles.

In the above-constructed magnet unit 7, the directions of magnetic lines of the first and second poles 7a, 7b opposing each other through the guide rail 3 are substantially perpendicular to the direction of magnetic lines of the third pole 7c. Further, the first pole 7a, the second pole 7b and the third pole 7c are arranged to oppose the first guide face 3a, the second guide face 3b and the third guide face 3c, respectively, through the intermediary of gaps (intervals). Accordingly, by controlling exciting currents to the electromagnets 71a, 71b, 73a, 73b, it is possible to adjust an attraction force of the magnet unit 7 to the guide rails 3. In detail, (1) if supplying the exciting currents to the electromagnets 71a, 71b, 73a, 73b in a direction to strengthen magnetic fluxes of the permanent magnets 72a, 72b, (1-1) since attraction forces between the first and second poles 7a, 7b and the first and second guide faces 3a, 3b of the guide rail 3 are increased at the same level as each other, respective increments in the attraction forces in the direction y cancel each other as a resultant force, the attraction force hardly changes; and (1-2) since the magnetic flux between the third pole 7c of the third guide faces 3c of the guide rail 3 is increased, the resulting attraction force is increased in the direction x.

(2) If supplying the exciting currents to the electromagnets 71a, 71b, 73a, 73b in a direction to weaken magnetic fluxes of the permanent magnets 72a, 72b, (2-1) since attraction forces between the first and second poles 7a, 7b and the first and second guide faces 3a, 3b of the guide rail 3 are decreased at the same level as each other, respective decrements in the attraction forces in the direction y cancel each other as a resultant force, the attraction force hardly changes; and (2-2) since the magnetic flux between the third pole 7c of the third guide faces 3c of the guide rail 3 is decreased, the resulting attraction force is decreased in the direction x.

(3) If supplying the exciting currents to the first and third electromagnets 71a, 73a in a direction to strengthen magnetic flux of the permanent magnet 72a and also supplying the exciting currents to the second and fourth electromagnets 71b, 73b in a direction to weaken magnetic flux of the permanent magnet 72b, (3-1) since the magnetic flux increases on the side of the first pole 7a while the magnetic flux decreases on the side of the second pole 7b in the direction y, a difference in attraction force is produced in the left-and-right direction of the guide rail 3, so that the magnet unit 7 is absorbed toward the first guide face 3a for approach; and (3-2) the change of magnetic flux about the third pole 7c is cancelled so that the attraction force hardly changes.

Note that, in connection with the above item (3), if supplying the exciting currents to the first and third electromagnets 71a, 73a in a direction to weaken magnetic flux of the permanent magnet 72a and also supplying the exciting currents to the second and fourth electromagnets 71b, 73b in a direction to strengthen magnetic flux of the permanent magnet 72b, there is no change in the direction x for stabilization, while the magnet unit 7 is absorbed toward the second guide face 3b for approach in the direction y.

As mentioned above, according to the above-constructed magnet unit 7, by controlling the exciting currents the first and second electromagnets 71a, 71b and the third and fourth electromagnets 73a, 73b forming the center electromagnet 73, it is possible to adjust the attraction forces of the magnet unit 7 on the guide rail 3 in the directions x and y individually.

In the above description, the control of exciting currents to increase and decrease the fluxes of the first and second permanent magnets 72a, 72b can be accomplished by connecting the coils 71aa, 73aa of the electromagnets 71a, 73a and the coils 71ba, 73ba of the electromagnets 71b, 73b in series.

As obvious from above, on condition of adopting the above-mentioned magnet unit 7 of the first embodiment as the elevator guiding apparatus and further installing four units 7 to four (up, down, left and right) corners of the elevator car 6 through the pedestals 8 together with the sensors 2 while opposing the guide rails 3, the control of exciting currents to the respective electromagnets allows, the elevator car 6 to be posture-controlled to a translational direction (i.e. x-y directions) in the horizontal plane and a rotational direction (i.e., ξ, θ, φ directions), whereby non-contact and stable guide control of the elevator car 6 to the guide rails 3 can be accomplished.

Figure 7:
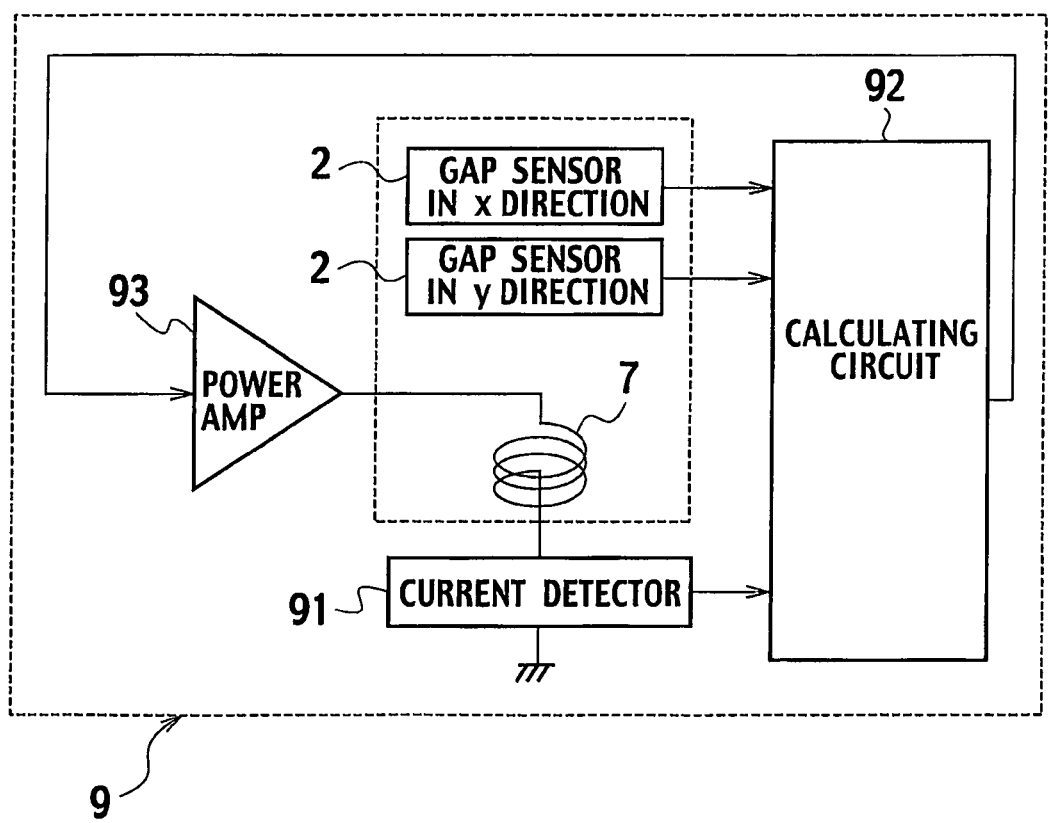
FIG. 7 is a structural view of a circuit of the elevator guiding apparatus of FIG. 3.

FIG. 7 is a structural view of a circuit of the elevator guiding apparatus provided by adding a controller to the magnet unit 7 of the first embodiment and the sensors 2. Thus, the elevator guiding apparatus includes the electromagnets 71a, 71b, 73a, 73b of the magnet unit 7, the sensors 2 for detecting physical values in the magnetic circuit (path) formed by the magnet unit 7 through the guide rail 3, for example, gap sensors for detecting the sizes of gaps between the respective poles of the unit 7 and the guide rail 3 in both directions x and y, and a current detector 91, a calculating circuit 92 and a power amplifier 93.

Inputting detection signals from the current detector 91 for detecting values of exciting currents flowing the electromagnets and signals from the sensors 2, as heretofore, the calculating circuit 92 calculates voltage values to be applied on the electromagnets 71a, 71b, 73a, 73b of the magnet unit 7 and further supplies the voltages to them through the power amplifier 93. Therefore, according to the elevator guiding apparatus, it is possible to accomplish a stable guide control of the elevator car 6 with uniform attraction force having no directional deviation in the horizontal direction to the guide rails 3, 3 and also uniform controllability.

In a normal state of the position of the elevator car 6 with respect to the guide rails 3, 3, it is possible to allow the exciting currents of the magnet unit 7 to converge to zero irrespective of changes in weight of the elevator car 6 and its magnitude of a disproportional force, whereby the elevator car 6 can be guided by only magnetic forces of the permanent magnets 72a, 72b, that is, "zero-power control", and thus the elevator car 6 is stabilized.

Note, in the above description, respective end faces of the poles of the magnet unit 7 may be covered with solid lubricating members made of material including e.g. Teflon (registered trademark), carbon or molybdenum disulfide, allowing the elevator car 6 to elevate smoothly due to sliding using such solid lubricating members.

Repeatedly, according to the embodiment, the permanent magnets 72a, 72b are arranged on both sides of the magnet unit 7, and the electromagnets 71a, 73a; 71b, 73b are arranged on both sides of the permanent magnets 72a, 72b, respectively. With the arrangement like this, since there is less difference between a distance (magnetic path) from the permanent magnet 72a to its magnetic pole and another distance (magnetic path) from the other permanent magnet 72b to its magnetic pole, a deviation of fluxes at the respective magnetic poles is reduced. Consequently, the difference of attraction force in between the direction x and the direction y is decreased to provide the magnet unit 7 under an appropriately-balanced condition.

Additionally, according to the embodiment, since the magnet unit 7 has the center electromagnet 73 arranged between the electromagnets 72a and 72b and the center electromagnet 73 makes it possible to easily control an attraction force in the direction x, the individual controllability of the attraction force to the directions x and y is improved as a whole.

Note that, in the above-mentioned magnet unit 7 for the elevator guiding apparatus, the center electromagnet 73 is formed by two electromagnets 73a, 73b. In a modification, if only arranging electromagnets on both sides of the permanent magnets 72a, 72b each, the number of electromagnets may be decreased to construct the center electromagnet 73 by one common coil winding.

The second embodiment where the center electromagnet 73 of the magnet unit 7 is formed by the single electromagnet will be described with reference to FIG. 8.

Figure 8:
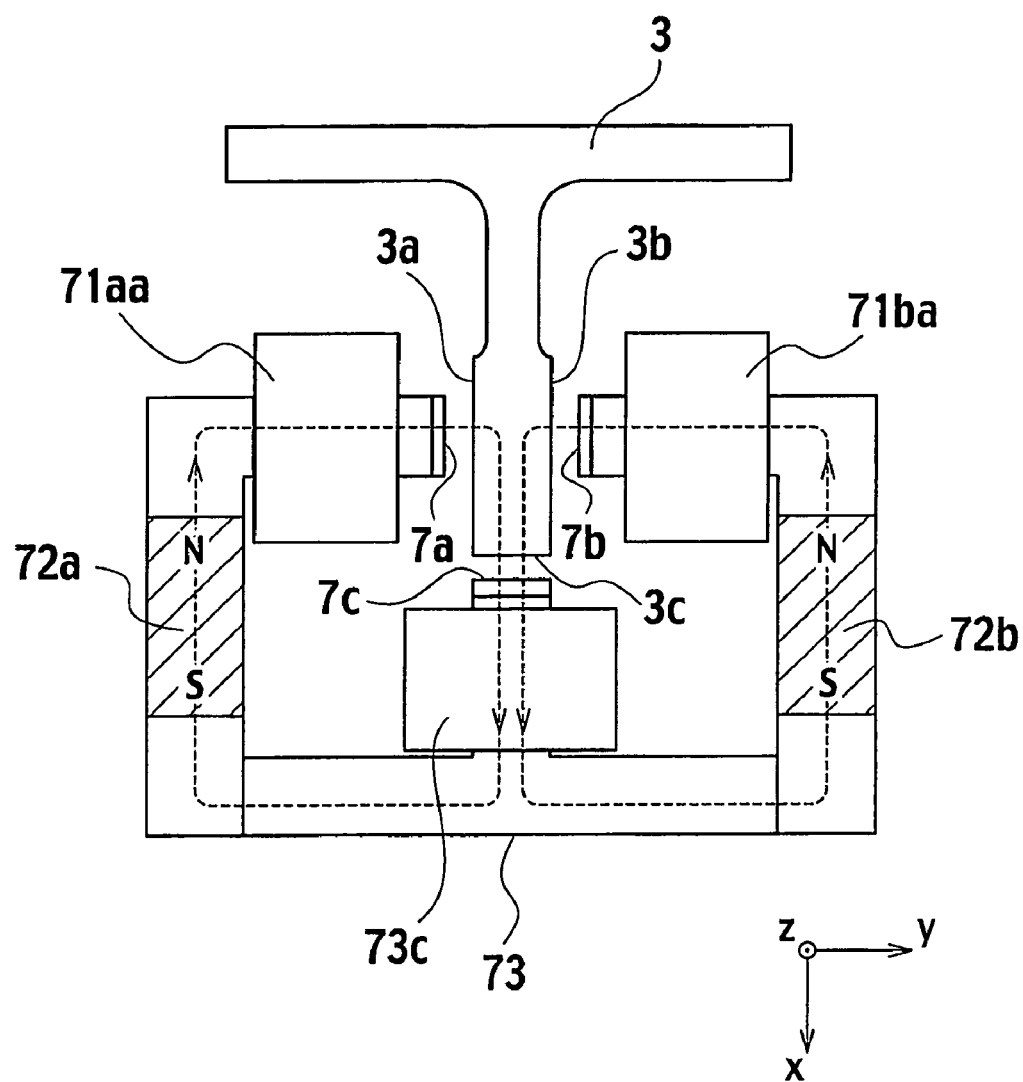
FIG. 8 is a plan view of a magnetic circuit of the magnet unit in accordance with the second embodiment of the present invention.

As shown in this figure corresponding to FIG. 8 of the first embodiment, an electromagnet 73c is arranged at a projecting part of the third pole 7c of the center electromagnet 73 to form a magnetic circuit (magnetic path) in common with the permanent magnets 72a, 72b.

Similar to the first embodiment, a magnetic path between the permanent magnet 72a and its pole is substantially equal to that between the permanent magnet 72b and its pole. Thus, while a difference in the attraction force between the directions becomes small, by controlling the exciting currents to the respective electromagnets 71a, 72b, 73c based on the sensors 2 in the adoption of the elevator guiding apparatus, it is possible to control attraction forces in both directions x and y individually, allowing the elevator car 6 to be controlled between the guide rails 3 in a non-contact manner in the horizontal direction.

By reason that the magnet unit 7 in common with the first and second embodiments allows the attraction forces in both directions x and y to be controlled individually thereby attaining the guide of the elevator car 6 as a moving body in a non-contact manner in the horizontal direction due to zero-power control, the magnet unit 7 may be applied to a known weighing apparatus for measuring the weight of an object.

One embodiment of the weighing apparatus adopting the magnet unit 7 of the present invention will be described with reference to FIGS. 9 and 10.

Figure 9:
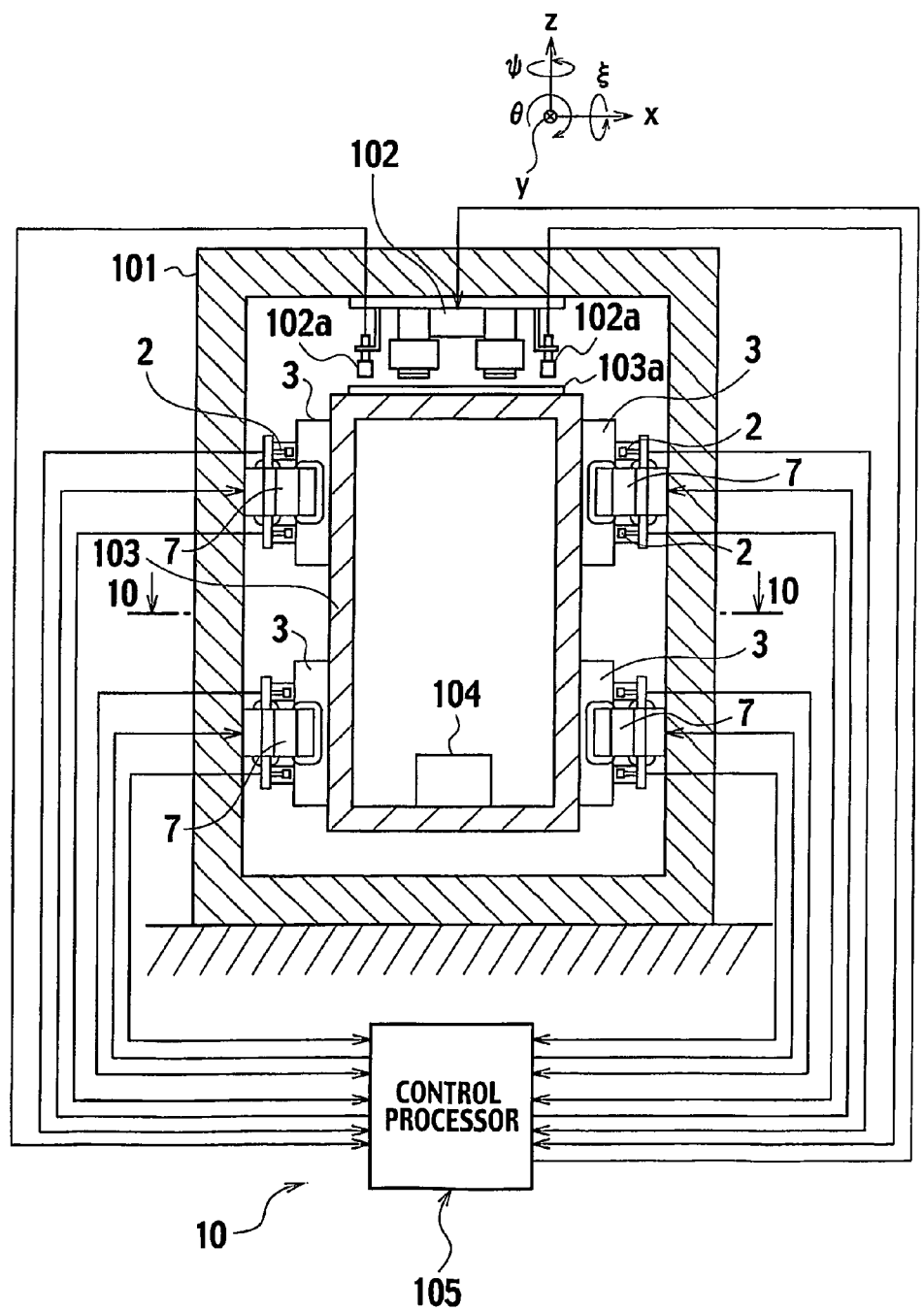
FIG. 9 is a structural view of a weighing apparatus having the magnet unit of the present invention.

FIG. 9 is a structural view showing the embodiment of the weighing apparatus of the invention. FIG. 10 is a sectional view taken along a line 10-10 of a frame in FIG. 9.

In the weighing apparatus 10, as already known, the upper part of the frame 101 is provided, on its interior side, with a magnet unit 102 for levitation control directing downwardly. A movable body 103 is included in the frame 101. While, the upper portion of the movable body 103 is provided, on its exterior side, with a guide 103 for magnetic levitation made of ferromagnetic material, such as iron, in an opposite position to the magnet unit 102.

The movable body 103 is attracted by the magnet unit 102 attached to the ceiling of the frame 101. On the upper part of the frame 101 and on the interior side, there are gap sensors 102a, 102a for detecting the sizes of gaps each between the magnet unit 102 and the guide 103a. On respective inner sidewalls of the frame 101 and at upper and lower positions, a pair of E-shaped magnet units 7, 7 in each sidewall are arranged so as to each interleave the guide members 3 in the form of rails from both sides thereof. Each of the guide members 3 is made of ferromagnetic material and attached to the movable body 103. As similar to the elevator guiding apparatuses of the first and second embodiments, the frame 101 is further provided with sensors 2 for detecting the conditions of magnetic circuits (i.e. physical value) at respective gaps each between the pole of the magnet unit 7 and the guide member 3.

Signals from the gap sensors 102a for magnetic levitation and the respective sensors 2 are transmitted to a control processor 105. Then, the control processor 105 controls the operations of respective electromagnets in both the magnet unit 102 and the magnet units 107 in the similar way.

Here, if an object 104 to be measured is mounted inside the movable body 103, then it is subjected to a load. In this state, the control processor 105 calculates the weight of the object 104, based on an attraction force and gap both generated between the magnet unit 102 lifting up the movable body 103 stably and the guide 103a.

In FIG. 9, left and right direction in figure is defined as "x direction"; a direction of a normal line to the figure is defined as "y direction"; and the vertical direction is defined as "z direction". Respective rotating directions around the respective x, y, z directions as axes of rotation are defined as "$\xi$, $\theta$, $\phi$ directions", respectively. In the weighing apparatus, the control of translating movement of the movable body 103 in the direction z is assumed by the magnet unit 102, while the other translating movements in the directions x, y and the control of the rotational movements in the directions $\xi$, $\theta$, $\phi$ are assumed by the magnet units 7.

That is, with the similar principle to those of the elevator guiding apparatuses of the first and second embodiments regarding both cross and horizontal directions (both directions x, y), it is possible to support the movable body 3 corresponding to the elevator car 6 horizontally in a non-contact manner.

According to the embodiment, the guide members 3 are mounted on the movable body 103, while both of the magnet units 7 and the sensors 2 are mounted on the frame 101. Therefore, since there is no need to arrange any component for power supply on the side of the movable body 103, it is possible to simplify the structure of the movable body 103.

Figure 10:
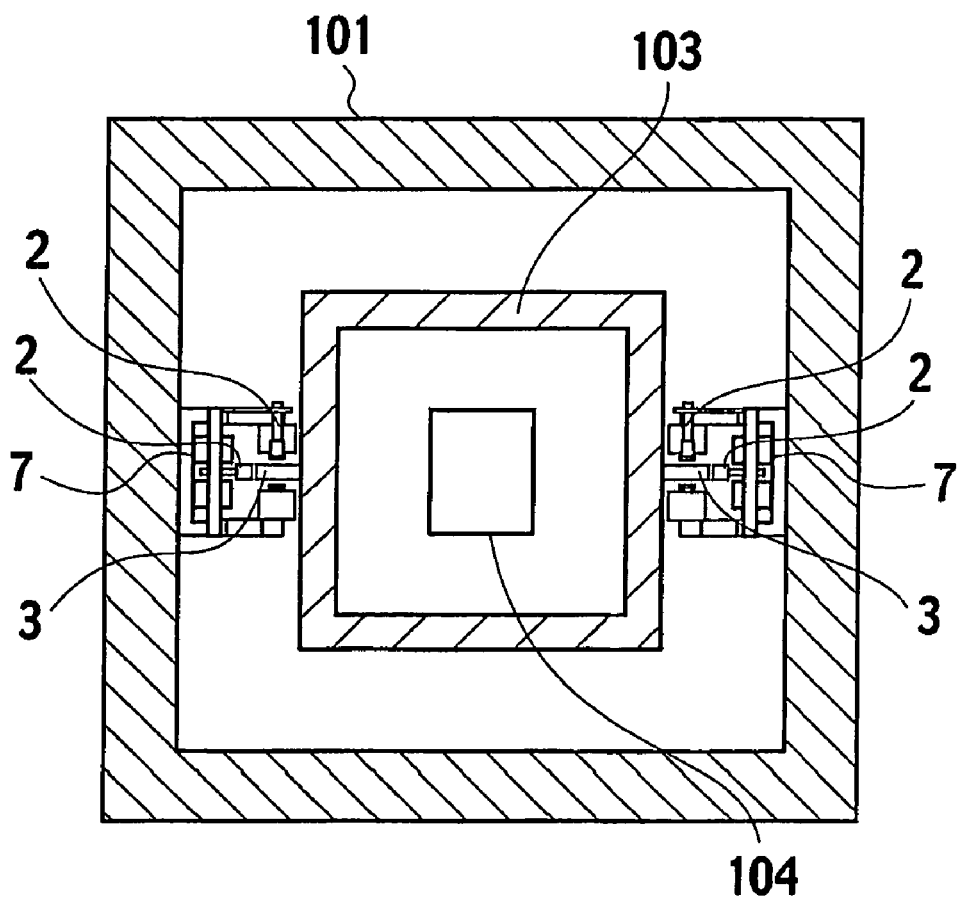
FIG. 10 is a sectional view taken along a line 10-10 of a frame of FIG. 9.
Figure 10:
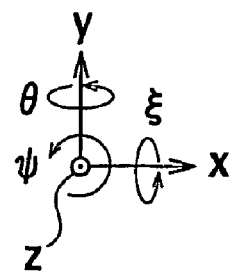

Note that there is need to arrange components for power supply on the side of the frame 101 due to the arrangement of the magnet units 7 and the sensors 2 on the side of the frame 101 in the above-mentioned weighing apparatus of FIGS. 9 and 10. In a modification, the magnet units 7 and the sensors 2 may be arranged on the side of the movable body 103 on condition of arranging the guide members 3 on the side of the frame 101.

In any case, according to the weighing apparatus adopting the magnet unit 7 of the invention, it is possible to realize an improved controllability in the directions of respective axes and it is also possible to provide a well-balanced and stable weighing apparatus.

The invention claimed is:

1. A magnet unit having an E-shaped configuration, comprising:
   a first magnetic pole;
   a second magnetic pole opposed to the first magnetic pole, the second magnetic pole having the same polarity as the first magnetic pole;
   a third magnetic pole arranged at a center between the first magnetic pole and the second magnetic pole, the third magnetic pole having a different polarity from the polarity of the first and second magnetic poles;
   a first magnet defined between the first magnetic pole and the third magnetic pole, the first magnet comprising a first electromagnet, a third electromagnet, and a first permanent magnet, the first electromagnet and the third electromagnet connected with each other through the intermediary of the first permanent magnet; and
   a second magnet defined between the second magnetic pole and the third magnetic pole, the second magnet comprising a second electromagnet, a fourth electromagnet, and a second permanent magnet, the second electromagnet and the fourth electromagnet connected with each other through the intermediary of the second permanent magnet, wherein the first and second permanent magnets are arranged on upper and lower sides of the E-shaped configuration of the magnet unit, respectively, the first permanent magnet is sandwiched between the first and third electromagnets, and the second permanent magnet is sandwiched between the second and fourth electromagnets.

2. The magnet unit of claim 1, wherein the first, second and third magnetic poles are arranged so as to oppose a guide member of magnetic material through respective gaps, the magnet unit further comprises sensors adapted to detect respective conditions of magnetic circuits in the magnet unit.

3. The magnet unit of claim 1, wherein the third electromagnet and the fourth electromagnet are formed by a single electromagnet.

* * * * *